United States Patent [19]

Yang

[11] Patent Number: 4,698,580
[45] Date of Patent: Oct. 6, 1987

[54] SIMPLE AUTOMATIC CHARGING OR CUTOFF CIRCUIT DEVICE FOR INTERMITTENT PULSATING D.C. CHARGING POWER SUPPLY

[76] Inventor: Tai-Her Yang, 5-1 Taipin St., Si-Hu Town, Dzan-Hwa, Taiwan

[21] Appl. No.: 743,750

[22] Filed: Jun. 12, 1985

[51] Int. Cl.$^4$ ............................................. H02J 7/10
[52] U.S. Cl. ................................ 320/59; 320/DIG. 2
[58] Field of Search ................. 320/2, 57, 59, DIG. 2; 362/211; 307/66

[56] References Cited

U.S. PATENT DOCUMENTS 3,176,212  3/1965  De Puy ......................... 320/DIG. 2
3,991,356 11/1976  Spiteri ...................... 320/DIG. 2 X
4,410,835 10/1983  Zabroski ......................... 362/211 X

OTHER PUBLICATIONS

GE SCR Manual (4th edition) 1967, pp. 69, 185, 186.

Primary Examiner—R. J. Hickey
Attorney, Agent, or Firm—Leonard Bloom

[57] ABSTRACT

A battery charging circuit which automatically cuts off whenever a battery becomes fully charged. The circuit includes a source of pulsating d.c. charging current and an SCR connected in series with a battery to be recharged. A resistor and capacitor are connected in series in the order named between the anode electrode and the cathode electrode of the SCR which has its gate electrode connected, via a diode, to the circuit point between the cathode and the resistor. A further resistor is connected across the capacitor. When the battery becomes substantially charged, the voltage which appears across the first-mentioned resistor is insufficient to fire the SCR and charging current is no longer delivered to the battery.

7 Claims, 1 Drawing Figure

SIMPLE AUTOMATIC CHARGING OR CUTOFF CIRCUIT DEVICE FOR INTERMITTENT PULSATING D.C. CHARGING POWER SUPPLY

BACKGROUND OF THE INVENTION

If charging current is continued after a rechargeable battery, such as a storage battery, is substantially fully charged overheating, speeding up of the evaporation rate of electrolyte and a shortening of the lifetime of a storage battery results. The present invention utilizes an RC detection circuit to control the charging current in each conduction cycle, thus protecting a storage battery with minimum cost.

SUMMARY OF THE INVENTION

There are many conventional circuits which have been developed for storage battery charging protection, but many of them involve the utilization of many components and are complex circuits which not only increases cost, but also increases failure rate. The present invention, on the other hand, involves only few parts, in particular, a RC detection circuit consisting of a series-connected resistor and a capacitor which circuit is connected in parallel across the anode and cathode electrodes of a SCR sensing the arrival time of each d.c. pulse. By the SCR switching action is thus actively controlled on a time basis, also the SCR is used as a periodic discharging path for the detection circuit. A simple periodically sensing automatic charging and cut-off circuit for over-charging protection of a storage battery has thusly been provided in accordance with the present invention.

DETAILED DESCRIPTION OF THE PREFERRED EMBODIMENT

Figure 1:
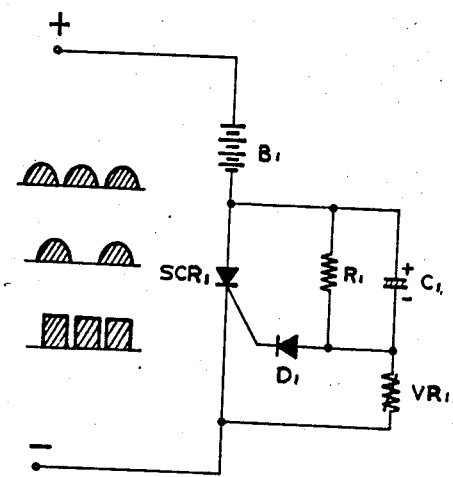
FIG. 1 is a schematic circuit diagram of a battery charging circuit in accordance with an exemplary embodiment of the present invention.

The embodiment of the invention illustrated in FIG. 1 (the sole figure) is a practical automatic charging and cut-off circuit which is used in a storage battery charger. The main aim is to eliminate fast electrolyte water evaporation, overheating and lifetime shortening of a storage battery from overcharging.

As shown in FIG. 1, the circuit includes a pulsating d.c. power source, which may be a halfwave or full wave rectifier or another intermittent pulsating d.c. power source which can cause an SCR to cut-off as the voltage passes over zero axis. The SCR is connected to the output side of the d.c. power source. A capacitor $C_1$ and a variable resistor $VR_1$ are connected in series with one another, the positive side of $C_1$ being connected to the anode electrode of the SCR. A diode $D_1$ has its anode electrode connected to the circuit point between the variable resistor $VR_1$ and the capacitor $C_1$, the cathode electrode of the diode $D_1$ being connected to the gate electrode of the SCR. The other end of the resistor $VR_1$ is connected to the cathode electrode of the SCR. The current output from the SCR is fed to a storage battery to be charged. The principle of operation of the above described circuit is set out below.

When a storage battery $B_1$ to be charged is connected in series with the anode electrode of the SCR then, during the arrival of a pulsating d.c. voltage, the larger part of the initial current passes through capacitor $C_1$ and the resistor $VR_1$ series circuit. Because of this current, an integration shaped voltage is built up on the capacitor $C_1$, and a differentiation shaped voltage is formed across the variable resistor $VR_1$. At this time, the differentiation shaped voltage is sufficient for triggering the SCR into its conduction state to charge the storage battery $B_1$ through the SCR during the remainder of this pulse period. Meanwhile the cumulated voltage on the capacitor $C_1$ is discharged by the SCR via the variable resistor $VR_1$ at the same time.

When the next pulsating d.c. voltage cycle arrives, the above described operating sequence will repeat itself once more. As the storage battery $B_1$ approaches a fully charged state, the charging current at each charging d.c. pulse cycle will be becoming gradually reduced because of the gradual voltage reduction which appears across the variable resistor $VR_1$.

When the voltage of the storage battery $B_1$ to be charged reaches its present saturation point (a substantially fully charged state), the differentiation shaped voltage across the resistor $VR_1$ is no longer of sufficient magnitude to trigger the SCR into its conduction state, the storage battery charging process is accomplished and the SCR no longer conducts.

A further resistor $R_1$, an auxiliary high value bleeding resistor, is used to bleed the residual charge which exists on the capacitor $C_1$ when the current from the battery charger is turned off (the SCR becomes nonconductive).

When the storage battery $B_1$ to be charged has reached its full charged state, the subsequent arrival of the pulsation d.c. voltage, because the battery $B_1$ is fully charged, only a small amount of current passes through the capacitor $C_1$ and the variable resistor $VR_1$. The voltage which appears across the variable resistor $VR_1$ is not of sufficient magnitude to trigger the SCR into its conduction state; consequently, the voltage on the capacitor $C_1$ increases and the SCR remains in its nonconductive state. At this time, only a small current passes through the large bleeding resistor $R_1$. Battery charging current no longer flows and cut-off of battery charging current has been achieved.

The variable resistance $VR_1$ can be a fixed resistor, or a step-variable resistor. The bleeding resistor $R_1$ and the diode $D_1$ can be eliminated, if desired.

Based on the above description, it is seen that the realized circuit of the present invention is reliable, stable and low in cost. An automatic battery-charging cut-off circuit is provided.

What is claimed is:

1. A battery charging circuit which automatically cuts off whenever a battery being charged becomes substantially fully charged, the circuit consisting of a source of pulsating d.c. charging current having a positive terminal and a negative terminal; an SCR having an anode electrode, a cathode electrode and a gate electrode; means for conductively connecting a battery to be charged between the positive terminal of the source of pulsating d.c. charging current and the anode electrode of the SCR, the cathode of the SCR being conductively connected to the negative terminal of the source of pulsating d.c. charging current; a first resistance across which a differentially shaped voltage of sufficient magnitude for triggering the SCR into its conductive state appears for each applied d.c. current pulse until a battery which is being recharged reaches substantially full charge and a capacitor connected in series with one another in denominated order between the cathode electrode and the anode electrode of the SCR; a second resistance conductively connected across the capacitor providing a discharge path for the capacitor; and a diode having an anode electrode and a cathode electrode, the cathode electrode of the diode being conductively connected to the gate electrode of the SCR and the anode electrode of the SCR being conductively connected to a circuit point between the capacitor and the first resistance, whereby charging current pulses can be delivered to a battery being recharged until substantially full charge is reached, the differentially shaped voltage thereafter which appears across the first resistance being insufficient to fire the SCR so long as the battery remains at substantially full charge.

2. The battery charging circuit according to claim 1, wherein the first resistance is a variable resistance.

3. A battery charging circuit which automatically cuts off whenever a battery being charged becomes substantially fully charged, the circuit consisting essentially of a source of pulsating d.c. charging current having a positive terminal and a negative terminal; an SCR having an anode electrode and a cathode electrode defining a battery charging current carrying path, and a gate electrode; means for conductively coupling a battery to be charged in series with the source of pulsating d.c. charging current and the battery charging current path; a resistance across which a differentially shaped voltage sufficient for triggering the SCR into its conductive state appears for each applied d.c. current pulse until a battery which is being recharged reaches substantially full charge and a capacitor connected in series with one another in denominated order between the cathode electrode and the anode electrode of the SCR; and means for coupling the gate electrode of the SCR to a circuit point between the capacitor and the resistance, whereby charging current pulses can be delivered to a battery being charged until substantially full charge is reached, the differentially shaped voltage thereafter which appears across the resistance being insufficient to fire the SCR so long as the battery remains at substantially full charge.

4. The battery charging circuit according to claim 1, wherein the resistance is a variable resistance.

5. The battery charging circuit according to claim 3, wherein the means for coupling the gate electrode of the SCR to a circuit point between the capacitor and the resistance is constituted by a diode which has a cathode electrode and an anode electrode, the anode electrode of the diode being conductively connected to the circuit point between the resistance and capacitor and the cathode electrode of the diode being conductively connected to the gate electrode of the SCR.

6. The battery charging circuit according to claim 5, including a resistor conductively connected across the capacitor.

7. The battery charging circuit according to claim 3, including a resistor conductively connected across the capacitor.

* * * * *